United States Patent
Juby et al.

(10) Patent No.: US 8,692,416 B2
(45) Date of Patent: Apr. 8, 2014

(54) OVERLOAD PROTECTION OF A VOLTAGE REDUCTION DEVICE

(75) Inventors: Lee Juby, Frodsham (GB); Philip M. Riley, Birkenhead (GB); Stephen Mangan, St. Ives (GB)

(73) Assignee: Southern Fox Investments Limited, Grand Cayman (KY)

( * ) Notice: Subject to any disclaimer, the term of this patent is extended or adjusted under 35 U.S.C. 154(b) by 370 days.

(21) Appl. No.: 13/131,730

(22) PCT Filed: Dec. 8, 2009

(86) PCT No.: PCT/GB2009/051661
§ 371 (c)(1),
(2), (4) Date: Sep. 16, 2011

(87) PCT Pub. No.: WO2010/067104
PCT Pub. Date: Jun. 17, 2010

(65) Prior Publication Data
US 2011/0316351 A1 Dec. 29, 2011

(30) Foreign Application Priority Data
Dec. 9, 2008 (GB) .................................. 0822404.0

(51) Int. Cl.
*H01H 37/00* (2006.01)
*H01H 47/24* (2006.01)
*H01H 47/26* (2006.01)

(52) U.S. Cl.
USPC ...................................................... 307/117

(58) Field of Classification Search
USPC .................. 307/117, 140; 361/35, 36, 37, 38
See application file for complete search history.

(56) References Cited

U.S. PATENT DOCUMENTS

| 4,951,168 A | 8/1990 | Harrison |
| 2003/0086218 A1* | 5/2003 | Folliot et al. .................... 361/37 |
| 2007/0109695 A1 | 5/2007 | Newlon |

FOREIGN PATENT DOCUMENTS

| GB | EP1913454 A1 | 7/2010 |
| JP | 9269842 | 10/1997 |

OTHER PUBLICATIONS

PCT/GB2009/051661, International Preliminary Report on Patentability, Jun. 14, 2011.
PCT/GB2009/051661, International Search Report, May 7, 2010.

* cited by examiner

*Primary Examiner* — Carlos Amaya
(74) *Attorney, Agent, or Firm* — Jeffrey G. Sheldon; Sheldon Mak and Anderson

(57) ABSTRACT

A system for reducing the voltage of an AC electrical supply to a load for the purpose of energy efficiency, comprising a transformer and power converter in circuit between an AC electrical supply and a load, and a bypass switch S to cause the transformer to be taken out of circuit and to connect the electrical supply to the load in the event of a sustained overload of the transformer. The system includes means (14) to measure the temperature of the transformer, means (17) to measure the electrical current in the circuit and control means (15) receiving signals from the sensors (14, 17) and to operate bypass switch S to bypass the transformer and allow it to cool. A fuse $F_2$ and thermal cut out device (16) are in circuit with the secondary winding of the transformer as failsafe means to interrupt the supply to the transformer in the event that the bypass switch fails to operate.

10 Claims, 5 Drawing Sheets

OVERLOAD PROTECTION OF A VOLTAGE REDUCTION DEVICE

CROSS-REFERENCE TO RELATED APPLICATIONS

This application is a U.S. national stage patent application and claims priority from International Application No. PCT/GB2009/051661, filed Dec. 8, 2009 and entitled "OVERLOAD PROTECTION OF A VOLTAGE REDUCTION DEVICE," which claims priority from UK patent application No. 0822404.0, filed Dec. 9, 2008 and entitled "VOLTAGE REDUCTION"; the contents of which are incorporated in this disclosure by reference in their entirety.

This invention concerns a system for reducing the voltage of an AC electrical supply to a load for the purpose of energy efficiency. It is recognised that reducing the electrical voltage applied to a load reduces the power drawn by that load. The system will incorporate a transformer. However, in a domestic or small commercial application it is desirable to minimise the cost of such a transformer in order to achieve an increase in energy efficiency while maintaining a low cost base for the system as a whole.

It is known that the average or base load of a domestic or small commercial property is usually very low but is subject to peaks when, for short periods of time, high levels of current are drawn by the load. In such applications it is desirable to use a transformer with a continuous load capability rated at the average or base load of the property, but which can then operate within its thermal rating under overload conditions for very short periods without excessive overheating of the transformer windings to an extent which can cause destruction of the transformer. In addition, there may be occasions where the load in the property exceeds both the continuous and the short term rating of the transformer and in these circumstances, in order still to use a low cost transformer, it is an object of the present invention to provide a system whereby the transformer can be bypassed to avoid overheating.

It is another object of the present invention to provide such a system with failsafe means to prevent the destruction of the transformer, and a potential fire risk, should the bypass fail. According to the present invention there is provided a system for reducing the voltage of an AC electrical supply to a load for the purpose of energy efficiency, the system comprising:
  a) a transformer having primary and secondary windings in circuit between an AC electrical supply and the load, and
  b) bypass means to cause the transformer to be taken out of circuit and to cause the electrical supply to be connected directly to the load in the event of a predetermined overload of the transformer;
  characterised in that
  c) the bypass means comprises:
    i) a bypass switch to divert the supply directly to the load,
    ii) means to determine the temperature of the transformer,
    iii) means to measure the electrical current through the load,
    iv) control means to receive signals from the temperature determining means and from the current measuring means, and to operate the bypass switch at a maximum predetermined level of either one of both said temperature and current; and in that the system further comprises:
  d) failsafe means to interrupt current through the secondary winding of the transformer in the event that the bypass switch fails to operate at either one of said predetermined maximum levels, wherein the failsafe means includes
    i) a thermal trip device connected to the secondary winding of the transformer and adapted to interrupt the connection of the secondary winding of the transformer to the supply at a predetermined elevated temperature of the transformer after a predetermined period; and
    ii) a fuse connected in series with the supply and the thermal trip device and adapted to interrupt the connection of the secondary winding of the transformer to the supply at a predetermined elevated current level below a maximum current rating of the thermal trip device.

The electrical supply may be connected to the secondary winding of the transformer.

The fuse may be prevented from false interruption by the current measuring means which, via the control means, is adapted to operate the bypass switch at a current level below the maximum current rating of the fuse. Thus, while the fuse has a lower rating than the maximum permitted current of the load, if the system operates correctly it will be isolated from the load during peak current by normal operation of the bypass switch. It has such a lower rating to protect the thermal trip device which will be rated to trip only on sustained high temperature rise of the secondary windings, which high temperature may not always be reached despite a the maximum current rating of the trip device being exceeded. Nevertheless, the arrangement enables a fuse to be employed whose rating is above a current load that, if sustained, would cause the temperature of the secondary winding, in the event that the bypass switch did not operate, to rise above the tripping temperature of the thermal trip device. Thus the thermal trip device and fuse work in conjunction with one another to protect the secondary winding in the event that the bypass switch fails to operate.

The term "fuse" as used herein includes any circuit breaker that has the same or similar characteristics of a resistive fuse, that is to say, one that operates quickly at a high overload current or eventually after a sustained low overload current.

A supply fuse may be connected between the supply and the load, and adapted to protect the load when the transformer is bypassed.

A power converter may be connected between the electrical supply and the primary winding of the transformer.

An embodiment of the invention will now be described, by way of example, with reference to the accompanying drawings in which.

Figure 1:
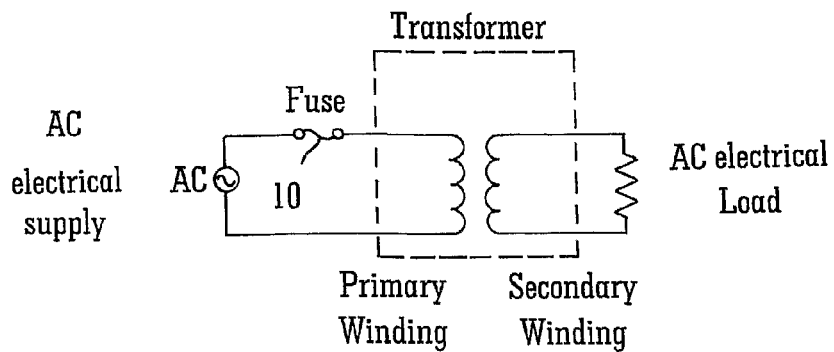
FIG. 1 is a circuit diagram of a simple and conventional transformer protection device.

Transformers used to change the magnitude of the voltage in an AC electrical power system are usually selected and operated within their continuous power ratings to ensure that they do not overheat and fail, possibly causing a fire risk. In such installations the circuit is usually protected from excessive current and short circuit by a fuse, as illustrated at 10 in FIG. 1.

In some cases transformers are used in circuits operating beyond the continuous rating but where the operating profiles and environmental conditions are known. During operation beyond the continuous rating it is recognised that the transformer will heat up and continue to heat up. A thermal equilibrium cannot be achieved in these cases but the transformer will not fail if the overload is not sustained in time to a point where the temperature would cause the transformer to fail. In these cases protection of the transformer is by means of a circuit breaker or a fuse with a thermal overload characteristic and a short circuit characteristic. The circuit breaker or fuse characteristics must guarantee power interruption before the thermal limit of the transformer is exceeded.

Figure 2:
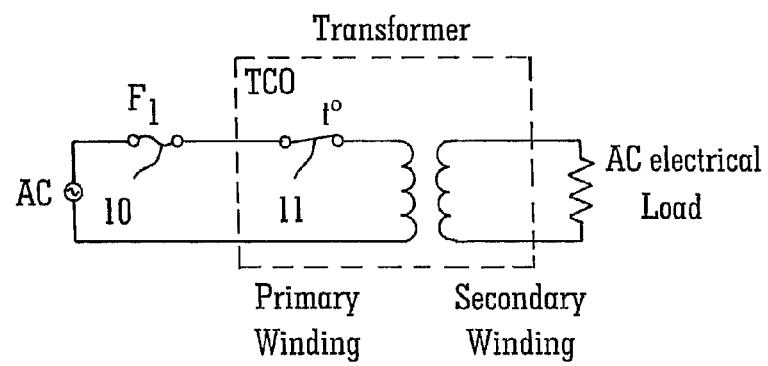
FIG. 2 is a circuit diagram of an improved but still conventional transformer protection device.

If the operating profile of the transformer or the environmental conditions cannot be defined and guaranteed then the transformer cannot be operated beyond its continuous rating without additional thermal protection. In small transformers this additional thermal protection is often implemented as a simple bi-metallic thermal cut out (TCO) trip connected in series with the primary winding of the transformer, usually the lower current winding. In larger, high current transformers, this additional thermal protection can be achieved by using a thermal monitor which remotely triggers the circuit breaker placed in the supply. Such an arrangement is illustrated in FIG. 2, where the thermal cut out trip device is illustrated at 11 and is placed in series with the fuse 10 in the circuit to the primary winding of the transformer. In this case, if the temperature of the thermal cut out reaches a trip temperature then the TCO interrupts power to the primary winding of the transformer.

Figure 3:
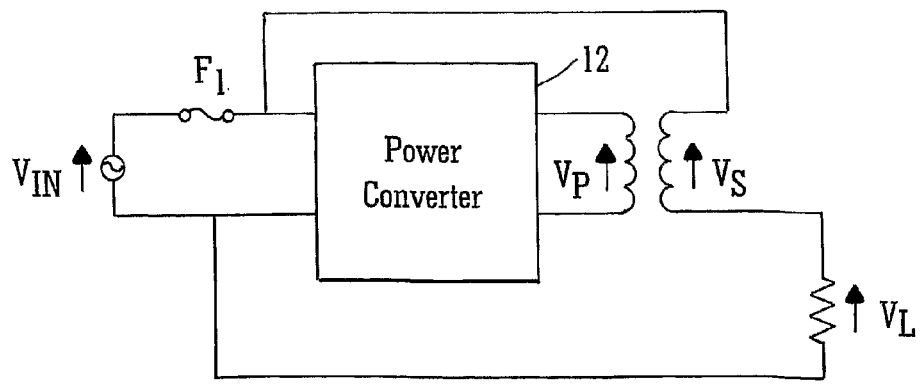
FIG. 3 is a circuit diagram showing the use of a transformer for voltage regulation.

In a system for reducing the voltage of an AC electrical supply to a load for the purpose of energy efficiency, a transformer is used to generate anti-phase voltage and is used with a power converter for simple voltage regulation in a circuit, as illustrated in FIG. 3. In this circuit the electrical current supplied to the load from the AC supply $V_{IN}$ is provided to the load through the transformer secondary winding $V_s$. A power converter 12 is connected in the circuit to the primary winding $V_p$. A voltage is developed in the secondary winding $V_s$ which is proportional to the voltage imposed on the primary winding $V_p$ and the voltage developed at $V_s$ is known as being in anti-phase to the supply voltage and is therefore subtracted therefrom. The electrical load therefore receives a voltage $V_L$ which is equal to the supply voltage $V_{IN}$ less the magnitude of the secondary voltage $V_s$. This is further explained in the following example.

Assume a 250 volt supply voltage and a 10:1 ratio transformer, the voltage on the secondary winding $V_s$ will be 25 volts. The power converter can be used to vary the voltage supplied to the primary winding from 0 volts to 250 volts. The benefit of this circuit is that the power rating of the power converter and transformer can be much lower than the power rating of the load. The actual power rating is set by the turns ratio of the transformer, ie, for a 10:1 ratio the power rating of the power converter and transformer needs only to be 10%. In the circuit illustrated in FIG. 3, overload and short circuit protection is achieved by the fuse $F_1$.

A voltage regulation circuit such as that illustrated in FIG. 3 can be employed in a domestic house for energy efficiency. The load profile of such a property would show extended periods of very low load with infrequent instances of high peak loads for short durations. In such a case the peak loads achieved are much higher than the average load on the property. It is proposed that such a circuit could be rated for the average load in the property and then allowed to operate in overload conditions for short periods during high power spikes. Such a circuit may include a thermally controlled bypass device which will cause the electricity to bypass the voltage regulating circuit if the thermal limit of such circuit is reached. Such a system is described in patent specification EP 1 913 454.

Figure 4:
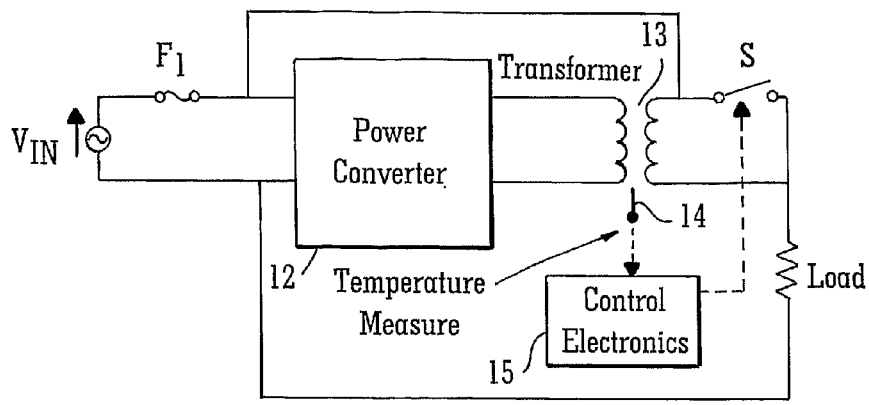
FIG. 4 is a circuit diagram of an improved transformer protection device incorporating temperature control.

In FIG. 4 the circuit includes a thermally controlled bypass switch S. In this circuit the power converter 12 and transformer 13 are rated for the average load expected of the system. A temperature sensor 14 is provided which, continuously or intermittently, measures the temperature of the transformer. A signal is fed from the sensor 14 to an electronic control device 15 which, when a certain temperature is achieved, outputs a signal to close the switch S, thus connecting the load directly to the power supply via fuse $F_1$.

While the system illustrated in FIG. 4 will protect the transformer from excessive high temperature sustained over a period, there is a risk that the bypass switch S, or any other remotely operated thermal trip device, might fail, in which case the transformer would not be protected and could reach a temperature in which it would fail and possibly present a fire risk. National or international legislation might determine that such a risk is not acceptable.

In this system, fuse $F_1$ does not offer adequate protection for the power converter and transformer since it must be rated for the maximum possible peak load anticipated for the property.

Figure 5:
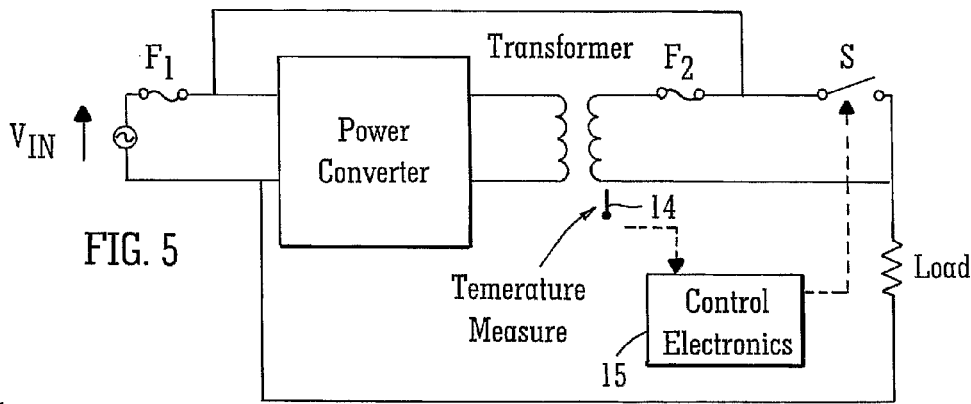
FIG. 5 is a circuit diagram of a further improved device in relation to FIG. 4.
Figure 6:
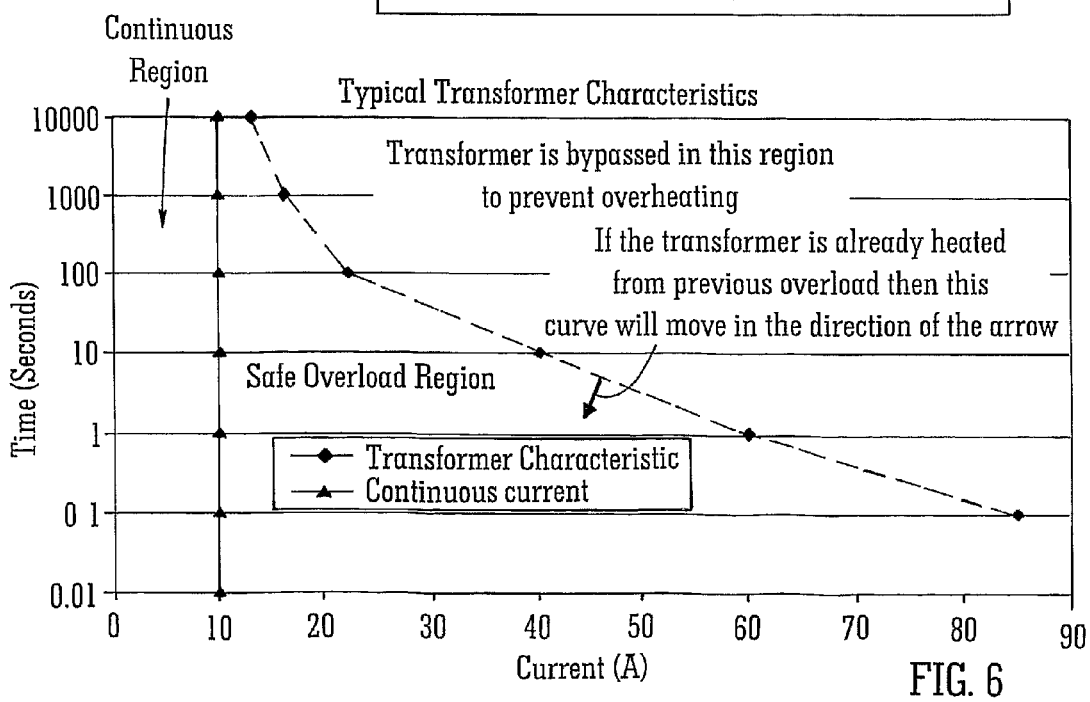
FIG. 6 is a graph showing the thermal characteristics of a transformer.

Referring now to FIG. 5, an additional fuse $F_2$ may be placed in series with the supply to the transformer, and have a lower current rating than the fuse $F_1$. Indeed, the fuse $F_2$ may be selected with a trip rating equal to the transformer continuous rating and must be placed in series with the secondary winding in order to interrupt current flow to the load through the transformer. A fuse placed in series with the primary winding would not interrupt current flow through the secondary winding. However, a fuse which matches the transformer characteristics cannot be selected, since those characteristics change depending upon the load conditions. Typical transformer thermal characteristics are illustrated in FIG. 6, where the continuous rating of the transformer at 10 amps may be sustained indefinitely but the transformer is bypassed in a region above a certain current after an associated time period. This is best described in the following examples.

Figure 7:
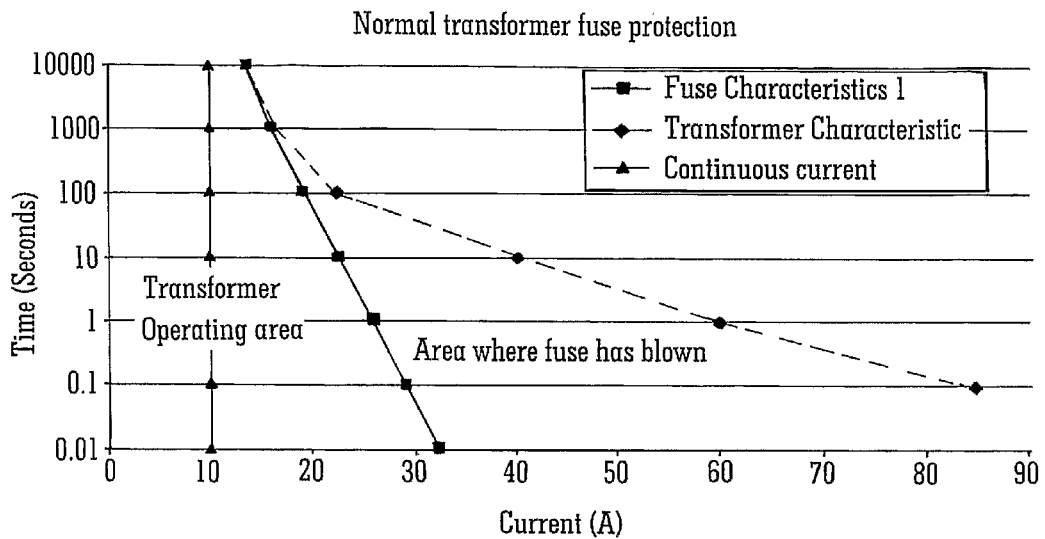
FIG. 7 is a graph similar to FIG. 6 showing transformer thermal characteristics with fuse protection, in relation to a given example.

Assuming an ambient temperature of 20° C. a transformer with a steady state temperature of 60° C. at maximum load may have a maximum operating temperature of 100° C. in overload. If the transformer has been operating at no load for several hours the temperature of the transformer will be ambient temperature, ie, 20° C. Assuming a load of twice the continuous rating of the transformer is then applied, it will heat up at a rate dictated by its thermal mass. It is desired that the transformer shall run in this overload condition until its temperature has increased by 80° C. to 100° C. Under normal operation the control electronics 15 in FIG. 4 would detect the 100° C. temperature and close the bypass switch S so that the load on the transformer ceases allowing the transformer to cool. Should the bypass switch S fail then the fuse $F_2$ will protect the transformer from continuous overload conditions. This is illustrated in FIG. 7, where the fuse $F_2$ is selected to clear the overload before the transformer thermal limits are exceeded. For example, the fuse $F_2$ will fail at, say, 30 amps after 0.1 seconds or at 20 amps after 100 seconds.

In another example, the transformer may have been operating at maximum continuous load for several hours and the temperature of the transformer will have reached 60° C. If a load of twice the continuous rating of the transformer is then applied, the transformer will heat up at a rate dictated by its thermal mass and will run in an overload condition until its temperature has increased, in this case, by 40° C. to 100° C. Under normal operation, the control electronics 15 will detect the 100° C. temperature and close the bypass switch S, and again once the switch is closed the load on the transformer is removed and it may cool. However, in this case the transformer has achieved 100° C. in half the time of the previous example because of the higher initial temperature of 60° C. instead of ambient temperature at 20° C.

Figure 8:
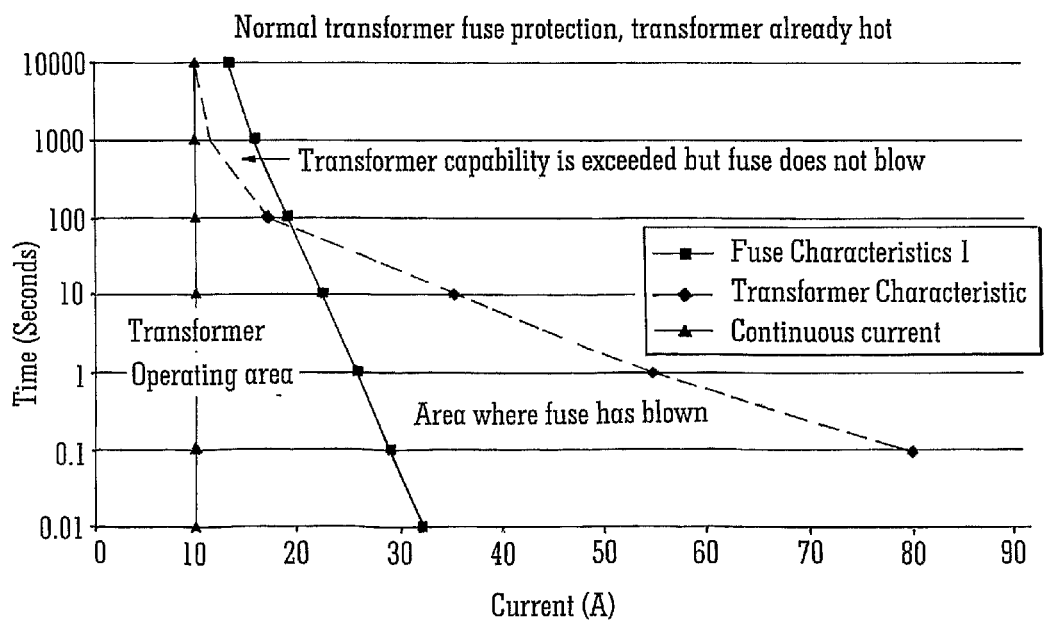
FIG. 8 is similar to FIG. 7 in relation to a different given example.

This condition is illustrated in FIG. 8, where there is a period in excess of 100 seconds in which fuse $F_2$ will not interrupt the supply and so a fuse with a faster acting characteristic would be required. This example shows how a simple fuse cannot offer thermal protection for the transformer.

Figure 9:
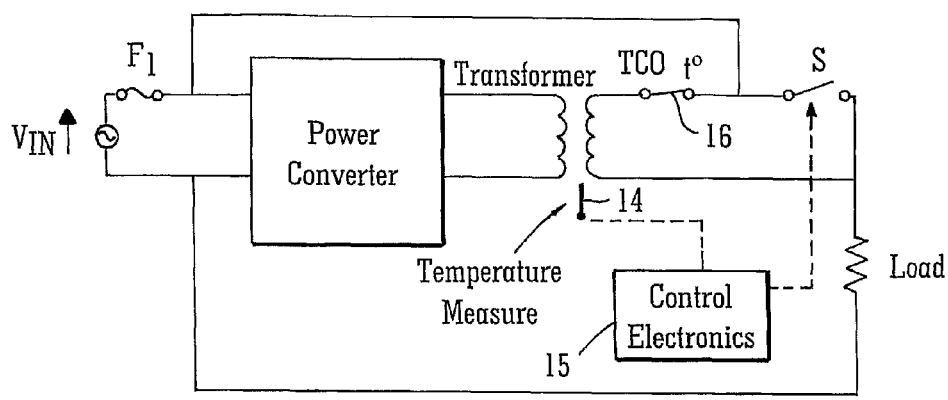
FIG. 9 is a circuit diagram of a device providing transformer thermal protection.

Referring now to FIG. 9, as an alternative method of protecting the transformer, a directly connected thermal trip device 16 (TCO) may be connected in series with the secondary winding of the transformer and will interrupt the current flow if the transformer exceeds a pre-set temperature, which can be set higher than the normal thermal control of the bypass switch S, but at a temperature still within safe limits.

As described earlier in relation to FIG. 2, transformers commonly employ thermal protection in the form of a thermal trip device (TCO) which is normally placed in circuit with the primary winding. In the case of a transformer with a 10:1 turns ratio primary current is ten times smaller than the secondary current. In the circuit illustrated in FIG. 3, for voltage regulation, a TCO cannot be employed in the primary winding, since in that case if an excessive temperature occurs and the TCO were to interrupt the supply then the current would continue to flow from the source to the load through the secondary winding. This would present two problems, namely the secondary winding would continue to overheat and fail, and the current in the secondary winding would try to induce a current in the open circuit primary winding, with the result that a very large voltage would be induced in the primary winding and would cause breakdown of the winding insulation.

A solution is to connect the thermal trip device 16 in circuit with the secondary winding as shown in FIG. 9 so that the TCO will interrupt load current to allow the transformer to cool.

However, a problem with TCOs is that they are limited in the capacity of current which they can handle when tripping without the introduction of sophisticated and costly arc shoots or remote tripping elements. This would not normally be a problem because the TCO typically is located on the lower current primary winding, but is a significant problem in the circuit where the TCO has to be connected to the high current secondary winding.

Direct-acting TCOs made with simple bi-metallic strips are readily available up to a rating of around 45 amps. However, beyond this rating a more sophisticated means of thermal protection is required involving complex arc shoots or remote operated contactors which may be too cumbersome and expensive for practical purposes and may introduce further failure possibilities into the circuit.

Figure 10:
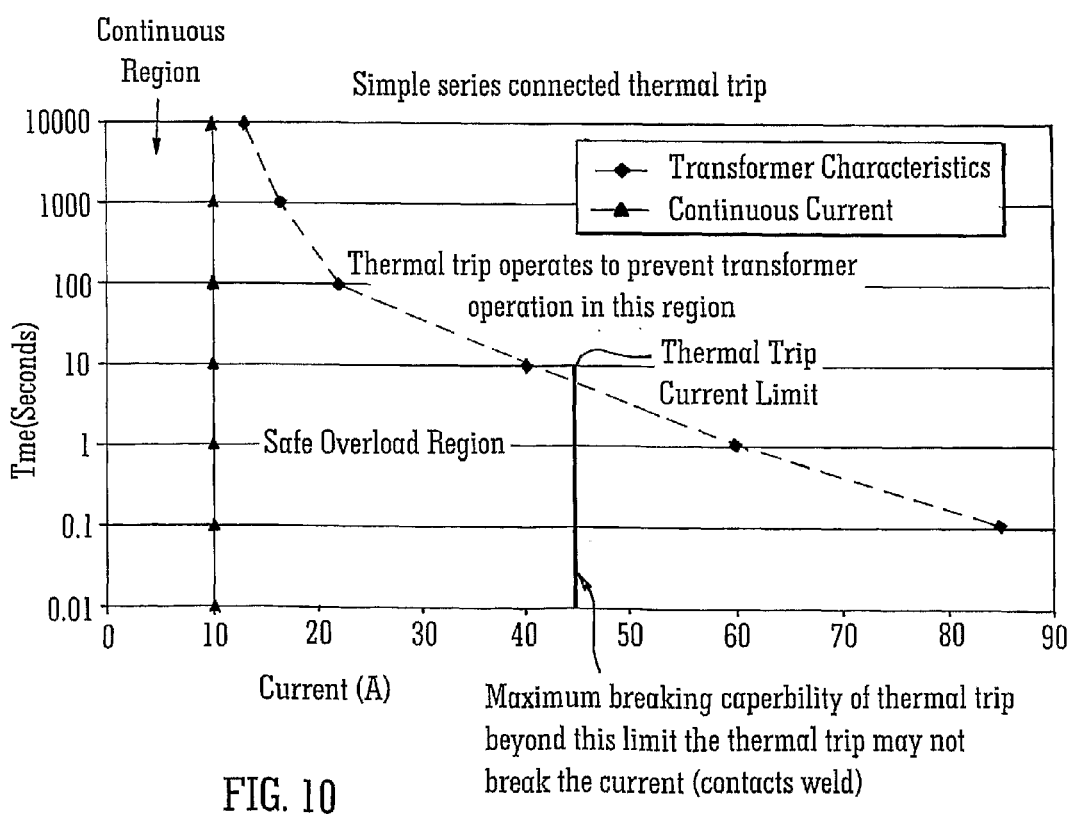
FIG. 10 is a graph showing the limitations of such thermal protection.

As described, the complete circuit including the load and the thermal trip 16 is protected by fuse $F_1$. In a domestic voltage regulation application the characteristic of $F_1$ may allow normal and overload currents far higher than the capability of the TCO. If the TCO tries to operate at a current level beyond its rating then it may fail to open, thus causing the transformer to overheat. If the rating of fuse $F_1$ is reduced to a level which will protect the TCO then peak load currents may cause the fuse to 'nuisance' trip. FIG. 10 illustrates the limitations of TCO current capability. It will operate adequately at around 45 amps for a continuous period of ten seconds, but may not operate if the current continues to rise, since its contacts may become welded.

Figure 11:
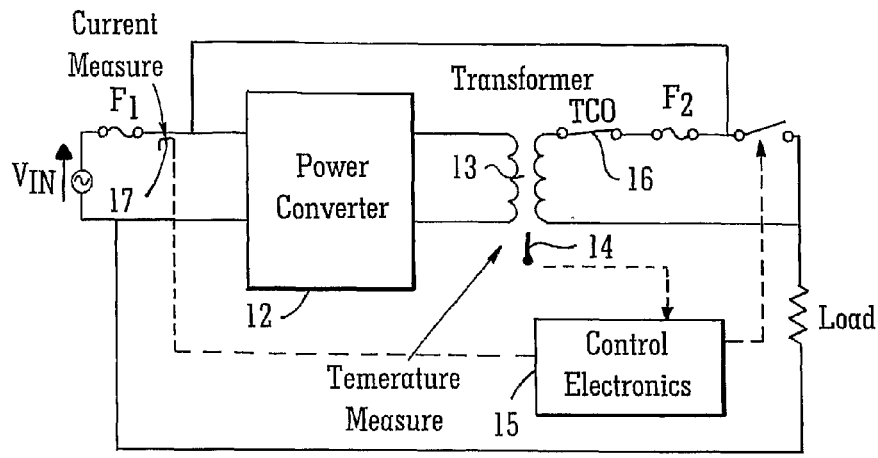
FIG. 11 is a circuit diagram of a voltage regulating transformer in circuit between an electrical power supply and a load, and incorporating an embodiment of the invention.

In accordance with the present invention, a solution to the aforementioned problems surrounding the use of fuses, bypass switches and thermal cut out devices is to provide a combination of protection features, as illustrated in the circuit of FIG. 11, in such a way that the circuit utilises the benefits of each protection feature and avoids the unwanted and potentially false tripping characteristics of individual circuit components. In this case, the circuit involves a fuse $F_2$ and a TCO 16 in circuit with the secondary winding of the transformer, a temperature sensor 14 and control electronics 15 acting together to operate bypass switch S, a current measurement sensor 17 which measures the current of the supply and is connected also to the control electronics 15 for a purpose which will be described, and finally fuse $F_1$ to protect the load in the event of closure of the bypass switch S.

Figure 12:
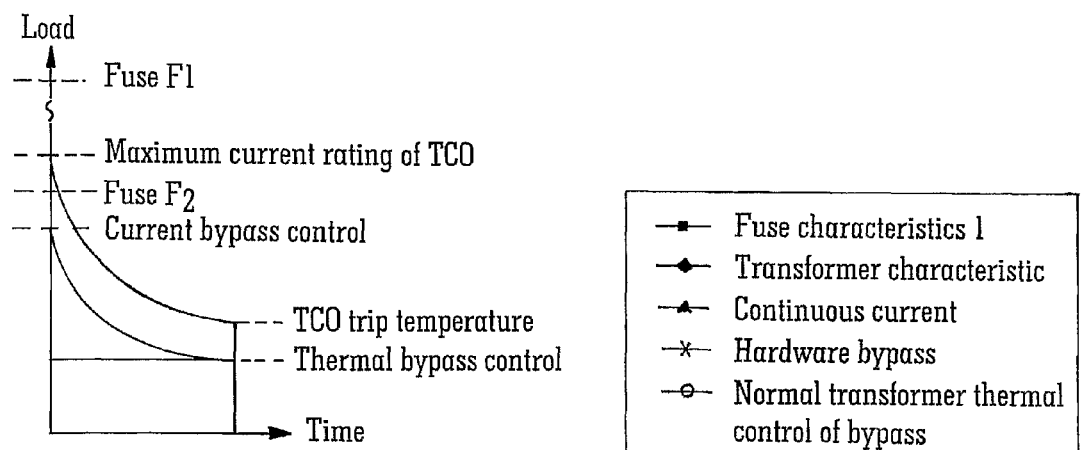
FIG. 12 is a diagram illustrating the characteristics of transformer protection in the circuit of FIG. 11.

FIG. 12 illustrates the combined transformer protection characteristics of the circuit of FIG. 11. In area 1 of FIG. 12 the transformer operates within its continuous operating capability where the load levels cause sustainable and limited temperature rises in the transformer. Area 2a represents the allowable overload region of the transformer for a limited period of time and this region is bounded by the effect of the thermally controlled bypass switch S. Thus, at a certain temperature and after a certain time period, the temperature sensor 14 will send a signal to the control electronics 15 to close switch S and thus bypass the power converter and transformer by connecting the supply directly to the load. Thus, the transformer may cool.

Should the switch S fail to close for some reason, then the transformer can safely operate for a period in the area labelled 2b in FIG. 2, ie, at a higher temperature for the same limit of time, after which the TCO 16 will trip to protect the transformer. The TCO thermal trip has a maximum sustainable current rating above which the fuse $F_2$ will interrupt the supply, again to protect the transformer. However, fuse $F_2$ is set to interrupt the supply at a level below the maximum electrical current rating of the TCO 16. Under normal operation it is possible that very large electrical current surges will occur which may break fuse $F_2$ before the transformer has reached its thermal trip level. In order to prevent such 'nuisance' operation of fuse $F_2$ a second bypass control is implemented. This is an electrical current-activated bypass control including the current sensor 17 connected to the control electronics 15 which operates to close switch S at a current level below the maximum rating of fuse $F_2$.

Fuse $F_1$ protects the load under transformer bypass conditions with switch S closed.

Figure 13:
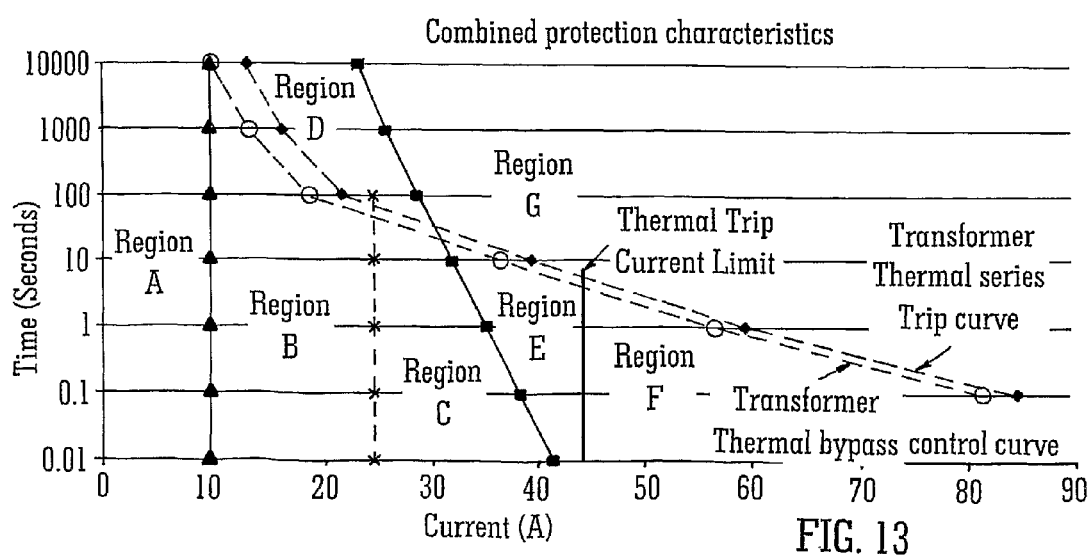
FIG. 13 is a graph showing the combined transformer protection of the circuit of FIG. 11.

FIG. 13 illustrates the effects of the circuit of FIG. 11 and may be expressed as follows.

Normal Operating Area

In region A continuous operating capability of the transformer is achieved without overheating. In region B, which is an overload region, it is bounded by the operation of the thermal control of bypass switch S or the current limit control achieved by the current reading sensor 17 to operate switch S.

Abnormal Operating Area

In region C, should the bypass switch S fail, the transformer may safely operate in this region and may be relieved by the operation of fuse $F_2$ or by tripping of the series connected TCO 16.

Unacceptable Operating Area

In region D the transformer will overheat and will not be able to operate in this region where it is protected by activation of the series connected TCO 16.

In region E the transformer will not be able to operate in this region and is protected by fuse $F_2$.

In region F, where the current level is beyond the rating of TCO 16, which is thus unreliable, the transformer will not be able to operate in this region as a result of breaking of fuse $F_2$.

In region G the transformer would overheat and will be prevented from operation by the breaking of fuse $F_2$.

Thus, the circuit of FIG. 11 provides overall protection for the transformer, principally by operation of the bypass switch S but with failsafe operation of TCO 16 and fuse $F_2$ at their appropriate ratings, and by the current measurement at 17.

The invention claimed is:

1. A system for reducing the voltage of an AC electrical supply to a load for the purpose of energy efficiency, the system comprising:
   a) a transformer having primary and secondary windings in circuit between an AC electrical supply and the load, and
   b) bypass means to cause the transformer to be taken out of circuit and to cause the electrical supply to be connected directly to the load in the event of a predetermined overload of the transformer;
   characterised in that
   c) the bypass means comprises:
      i) a bypass switch to divert the supply directly to the load,
      ii) means to determine the temperature of the transformer,
      iii) current measuring means to measure the electrical current through the load,
      iv) control means to receive signals from the temperature determining means and from the current measuring means, and to operate the bypass switch at a maximum predetermined level of either one of both said temperature and current; and in that the system further comprises:
   d) failsafe means to interrupt current through the secondary winding of the transformer in the event that the bypass switch fails to operate at either one of said predetermined maximum levels, wherein the failsafe means includes
      i) a thermal trip device connected to the secondary winding of the transformer and adapted to interrupt the connection of the secondary winding of the transformer to the supply at a predetermined elevated temperature of the transformer after a predetermined period; and
      ii) a fuse connected in series with the supply and the thermal trip device and adapted to interrupt the connection of the secondary winding of the transformer to the supply at a predetermined elevated current level below a maximum current rating of the thermal trip device.

2. A system according to claim 1, wherein the electrical supply is connected to the secondary winding of the transformer.

3. A system according to claim 1 or 2, wherein the fuse is prevented from false interruption by the continuous current measuring means which, via the control means, is adapted to operate the bypass switch at a current level below a maximum current rating of the fuse.

4. A system according to claim 1, including a supply fuse connected between the supply and the load and adapted to protect the load when the transformer is bypassed.

5. A system according to claim 1 or 2 including a power converter connected between the electrical supply and the primary winding of the transformer.

6. A system for reducing the voltage of an AC electrical supply to a load for the purpose of energy efficiency, the system comprising:
   a) a transformer having primary and secondary windings in circuit between an AC electrical supply and the load, and
   b) bypass means to cause the transformer to be taken out of circuit and to cause the electrical supply to be connected directly to the load in the event of a predetermined overload of the transformer;
   characterised in that
   c) the bypass means comprises:
      i) a bypass switch to divert the supply directly to the load,
      ii) a temperature sensor for sensing the transformer temperature,
      iii) a current measurement sensor adapted for measuring the electrical current through the load,
      iv) an electronic controller to receive signals from the temperature sensor and from the current measurement sensor, and to operate the bypass switch at a maximum predetermined level of either one of both said temperature and current; and in that the system further comprises:
   d) failsafe means to interrupt current through the secondary winding of the transformer in the event that the bypass switch fails to operate at either one of said predetermined maximum levels, wherein the failsafe means includes
      i) a thermal trip device connected to the secondary winding of the transformer and adapted to interrupt the connection of the secondary winding of the transformer to the supply at a predetermined elevated temperature of the transformer after a predetermined period; and
      ii) a fuse connected in series with the supply and the thermal trip device and adapted to interrupt the connection of the secondary winding of the transformer to the supply at a predetermined elevated current level below a maximum current rating of the thermal trip device.

7. A system according to claim 6, wherein the electrical supply is connected to the secondary winding of the transformer.

8. A system according to claim 6 or 7, wherein the fuse is prevented from false interruption by the current measuring sensor which, via the electronic controller, is adapted to operate the bypass switch at a current level below a maximum current rating of the fuse.

9. A system according to claim 6 or 7 including a supply fuse connected between the supply and the load and adapted to protect the load when the transformer is bypassed.

10. A system according to claim 6 or 7 including a power converter connected between the electrical supply and the primary winding of the transformer.

* * * * *